United States Patent
Yuan et al.

(10) Patent No.: US 12,418,920 B2
(45) Date of Patent: Sep. 16, 2025

(54) DEFAULT UPLINK MULTIPLE INPUT MULTIPLE OUTPUT TRANSMISSION PRIOR TO UPLINK TRANSMISSION CONFIGURATION INDICATION STATE ACTIVATION

(71) Applicant: QUALCOMM Incorporated, San Diego, CA (US)

(72) Inventors: Fang Yuan, Beijing (CN); Yu Zhang, San Diego, CA (US); Yan Zhou, San Diego, CA (US); Chao Wei, Beijing (CN); Tao Luo, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 465 days.

(21) Appl. No.: 17/759,578

(22) PCT Filed: Mar. 6, 2020

(86) PCT No.: PCT/CN2020/078182
§ 371 (c)(1),
(2) Date: Jul. 27, 2022

(87) PCT Pub. No.: WO2021/174526
PCT Pub. Date: Sep. 10, 2021

(65) Prior Publication Data
US 2023/0087394 A1    Mar. 23, 2023

(51) Int. Cl.
*H04W 72/23* (2023.01)
*H04L 5/00* (2006.01)
(Continued)

(52) U.S. Cl.
CPC .......... *H04W 72/23* (2023.01); *H04L 5/0051* (2013.01); *H04W 72/1268* (2013.01); *H04W 80/02* (2013.01)

(58) Field of Classification Search
None
See application file for complete search history.

(56) References Cited

U.S. PATENT DOCUMENTS 11,695,528 B2    7/2023  Zhang et al.
2012/0069812 A1*  3/2012  Noh .................. H04L 5/0048
                                              370/329
(Continued)

FOREIGN PATENT DOCUMENTS

| CN | 109150424 A | 1/2019 |
| CN | 109802787 A | 5/2019 |

(Continued)

OTHER PUBLICATIONS

R1-1912058 (Year: 2019).*

(Continued)

*Primary Examiner* — Christopher T Wyllie
(74) *Attorney, Agent, or Firm* — QUALCOMM IP DEPT.; James Hunt Yancey, Jr.

(57) ABSTRACT

Various aspects of the present disclosure generally relate to wireless communication. In some aspects, a base station may transmit, and a user equipment (UE) may receive, downlink control information (DCI) scheduling an uplink multiple input multiple output (MIMO) communication. The UE may transmit, and the base station may receive, the uplink MIMO communication using a default sounding reference signal (SRS) resource configuration based at least in part on the UE receiving the DCI prior to a medium access control (MAC) control element (MAC-CE) selecting a subset of uplink transmission configuration indication (TCI) states included in an uplink TCI state pool configured for the UE. Numerous other aspects are provided.

36 Claims, 6 Drawing Sheets

(51) Int. Cl.
*H04W 72/1268* (2023.01)
*H04W 80/02* (2009.01)

(56) References Cited

U.S. PATENT DOCUMENTS

| | | | | |
|---|---|---|---|---|
| 2019/0141693 | A1* | 5/2019 | Guo | H04W 72/1268 |
| 2019/0174466 | A1 | 6/2019 | Zhang et al. | |
| 2019/0327115 | A1 | 10/2019 | Zhang et al. | |
| 2021/0105805 | A1* | 4/2021 | Venugopal | H04W 72/046 |
| 2021/0135830 | A1* | 5/2021 | Yu | H04B 7/06966 |
| 2021/0195583 | A1* | 6/2021 | Venugopal | H04W 74/0833 |
| 2021/0219268 | A1* | 7/2021 | Li | H04B 17/318 |
| 2021/0297897 | A1* | 9/2021 | Cunningham | H04L 1/1825 |
| 2022/0209916 | A1* | 6/2022 | Krishnamoorthy | H04L 27/261 |
| 2023/0025072 | A1* | 1/2023 | Yuan | H04W 72/231 |
| 2023/0027791 | A1* | 1/2023 | Yuan | H04L 5/0053 |
| 2023/0087394 | A1* | 3/2023 | Yuan | H04W 72/23 370/329 |
| 2023/0421320 | A1* | 12/2023 | Levitsky | H04L 27/261 |
| 2024/0267925 | A1* | 8/2024 | Um | H04L 27/261 |
| 2025/0071639 | A1* | 2/2025 | Hong | H04W 36/00835 |

FOREIGN PATENT DOCUMENTS

| | | |
|---|---|---|
| CN | 110049561 A | 7/2019 |
| CN | 110474724 A | 11/2019 |
| CN | 110535617 A | 12/2019 |
| CN | 110661556 A | 1/2020 |
| CN | 110663282 A | 1/2020 |
| CN | 110839290 A | 2/2020 |
| CN | 115191097 B | 1/2025 |
| EP | 3809780 A1 | 4/2021 |
| WO | 2019214682 A1 | 11/2019 |
| WO | 2020033084 A1 | 2/2020 |
| WO | 2020042123 A1 | 3/2020 |
| WO | WO-2021174526 A1 * | 9/2021 ............ H04B 7/0404 |

OTHER PUBLICATIONS

LG Electronics: "Feature Lead Summary #4 of Enhancements on Multi-beam Operations", R1-1913453, 3GPP TSG RAN WG1 Meeting 99, Reno, USA, 3GPP Nov. 18-22, 2019 Parts 1, 2.1 and 3, pp. 1-40.
Taiwan Search Report—TW110101284—TIPO—Jul. 15, 2024.
Intel Corporation: "Discussion on TCI State Switching Requirements", 3GPP TSG-RAN WG4 Meeting #90bis, 3GPP Draft, R4-1902937, TCI State Switching REQT, 3rd Generation Partnership Project (3GPP), Mobile Competence Centre, 650, Route Des Lucioles, F-06921 Sophia-Antipolis Cedex, France, vol. RAN WG4, No. Xi 'an, China, Apr. 8, 2019-Apr. 12, 2019, Apr. 1, 2019 (Apr. 1, 2019), 6 Pages, XP051713432, Retrieved from the Internet: URL: http://www.3gpp.org/ftp/tsg%5Fran/WG4%5FRadio/TSGR4% 5F90Bis/Docs/R4%2D1902937%2Ezip [retrieved on Apr. 1, 2019] Section 2.3, Section 2.
International Search Report and Written Opinion—PCT/CN2020/078182—ISA/EPO—Nov. 26, 2020.
Qualcomm Incorporated: Enhanced TCI States Activation/Deactivation PDSCH MAC CE for Multi-TRP, 3GPP TSG-RAN WG2 Meeting #107bis, R2-1916066, Reno, Nevada, US, Nov. 18-22, 2019, Nov. 22, 2019 (Nov. 22, 2019) Section 2, 3 Pages.
LG Electronics: "Feature Lead Summary #4 of Enhancements on Multi-beam Operations," 3GPP TSG RAN WG1 Meeting #99, R1-1913453, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 25, 2019, pp. 1-40, XP051830732, p. 33.
Supplementary European Search Report—EP20922862—Search Authority—The Hague—Oct. 31, 2023.
First Office Action for Chinese Application No. 202080097779.7, dated Nov. 16, 2023, 15 pages.
Second Office Action for Chinese Application No. 202080097779.7, dated Jul. 27, 2024, 12 pages.
LG Electronics: "Feature Lead Summary#2 of Enhancements on Multi-beam Operations", 3GPP TSG RAN WG1 Meeting #99, R1-1913322, Reno, USA, Nov. 18-22, 2019, Nov. 26, 2019, pp. 1-38.
Korea Office Action for Application No. 10-2022-7030061, mailing date May 21, 2025 (including English-language translation generated by AI).

* cited by examiner

DEFAULT UPLINK MULTIPLE INPUT MULTIPLE OUTPUT TRANSMISSION PRIOR TO UPLINK TRANSMISSION CONFIGURATION INDICATION STATE ACTIVATION

CROSS-REFERENCE TO RELATED APPLICATION

This application is a 371 national stage of Patent Cooperation Treaty (PCT) Application No. PCT/CN2020/078182 filed on Mar. 6, 2020, entitled "DEFAULT UPLINK MULTIPLE INPUT MULTIPLE OUTPUT TRANSMISSION PRIOR TO UPLINK TRANSMISSION CONFIGURATION INDICATION STATE ACTIVATION," which is hereby expressly incorporated by reference herein.

FIELD OF THE DISCLOSURE

Aspects of the present disclosure generally relate to wireless communication and to techniques and apparatuses for a default uplink multiple input multiple output transmission prior to uplink transmission configuration indication state activation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include: receiving, from a base station, downlink control information (DCI) scheduling an uplink multiple input multiple output (MIMO) communication; and transmitting, to the base station, the uplink MIMO communication using a default sounding reference signal (SRS) resource configuration based at least in part on receiving the DCI prior to a medium access control (MAC) control element (MAC-CE) selecting a subset of uplink TCI states included in an uplink TCI state pool configured for the UE.

In some aspects, a method of wireless communication, performed by a base station, may include: transmitting, to a UE, DCI scheduling an uplink MIMO communication; and receiving, from the UE, the uplink MIMO communication using a default SRS resource configuration based at least in part on the UE receiving the DCI prior to a MAC-CE selecting a subset of uplink TCI states included in an uplink TCI state pool configured for the UE.

In some aspects, a UE for wireless communication may include a memory and one or more processors operatively coupled to the memory. The memory and the one or more processors may be configured to: receive, from a base station, DCI scheduling an uplink MIMO communication; and transmit, to the base station, the uplink MIMO communication using a default SRS resource configuration based at least in part on receiving the DCI prior to a MAC-CE selecting a subset of uplink TCI states included in an uplink TCI state pool configured for the UE.

In some aspects, a base station for wireless communication may include a memory and one or more processors operatively coupled to the memory. The memory and the one or more processors may be configured to: transmit, to a UE, DCI scheduling an uplink MIMO communication; and receive, from the UE, the uplink MIMO communication using a default SRS resource configuration based at least in part on the UE receiving the DCI prior to a MAC-CE selecting a subset of uplink TCI states included in an uplink TCI state pool configured for the UE.

In some aspects, a non-transitory computer-readable medium may store one or more instructions for wireless communication. The one or more instructions, when executed by one or more processors of a UE, may cause the one or more processors to: receive, from a base station, DCI scheduling an uplink MIMO communication; and transmit, to the base station, the uplink MIMO communication using a default SRS resource configuration based at least in part on receiving the DCI prior to a MAC-CE selecting a subset of uplink TCI states included in an uplink TCI state pool configured for the UE.

In some aspects, a non-transitory computer-readable medium may store one or more instructions for wireless communication. The one or more instructions, when executed by one or more processors of a base station, may cause the one or more processors to: transmit, to a UE, DCI scheduling an uplink MIMO communication; and receive, from the UE, the uplink MIMO communication using a default SRS resource configuration based at least in part on the UE receiving the DCI prior to a MAC-CE selecting a subset of uplink TCI states included in an uplink TCI state pool configured for the UE.

In some aspects, an apparatus for wireless communication may include: means for receiving, from a base station, DCI scheduling an uplink MIMO communication; and means for transmitting, to the base station, the uplink MIMO communication using a default SRS resource configuration based at least in part on receiving the DCI prior to a MAC-CE selecting a subset of uplink TCI states included in an uplink TCI state pool configured for the apparatus.

In some aspects, an apparatus for wireless communication may include: means for transmitting, to a UE, DCI scheduling an uplink MIMO communication; and means for receiving, from the UE, the uplink MIMO communication using a default SRS resource configuration based at least in part on the UE receiving the DCI prior to a MAC-CE selecting a subset of uplink TCI states included in an uplink TCI state pool configured for the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
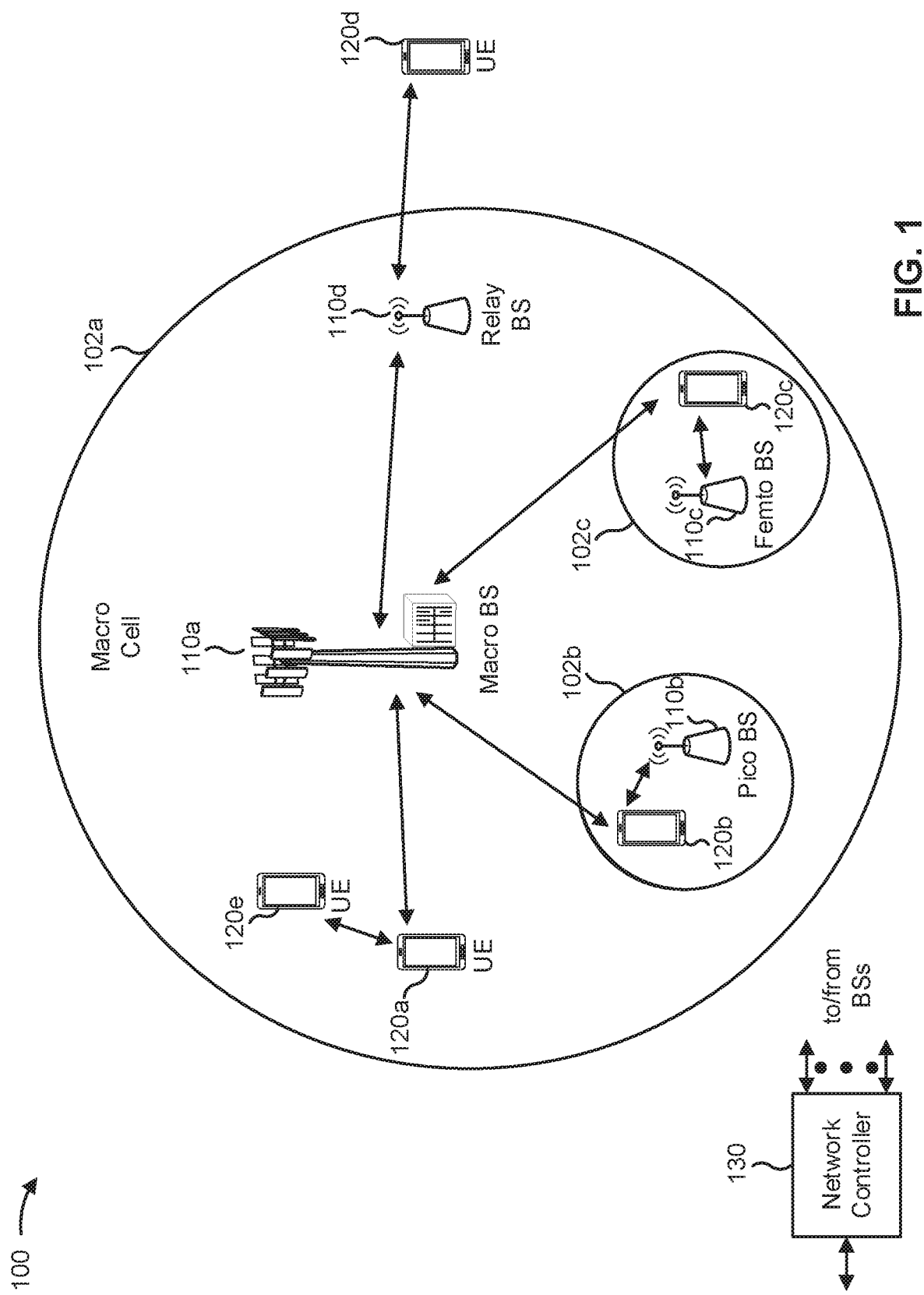
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
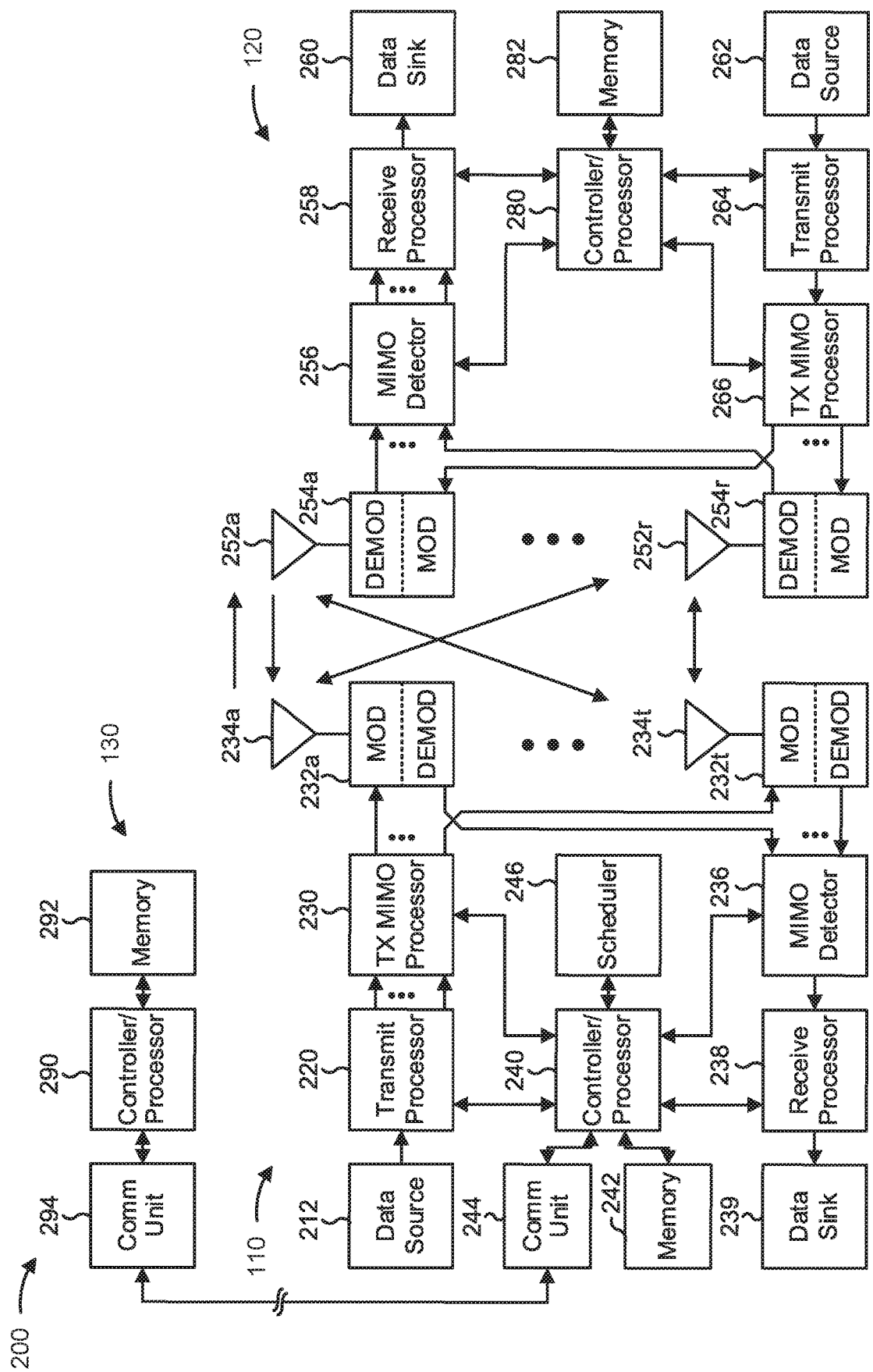
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a default uplink MIMO transmission prior to uplink transmission configuration indication (TCI) state activation, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 500 of FIG. 5, process 600 of FIG. 6, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for receiving, from base station 110, downlink control information (DCI) scheduling an uplink MIMO communication, means for transmitting, to base station 110, the uplink MIMO communication using a default sounding reference signal (SRS) resource configuration based at least in part on receiving the DCI prior to a medium access control (MAC) control element (MAC-CE) selecting a subset of uplink TCI states included in an uplink TCI state pool configured for UE 120, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to UE 120, DCI scheduling an uplink MIMO communication, means for receiving, from UE 120, the uplink MIMO communication using a default SRS resource configuration based at least in part on the UE receiving the DCI prior to a MAC-CE selecting a subset of uplink transmission configuration indication TCI states included in an uplink TCI state pool configured for UE 120, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
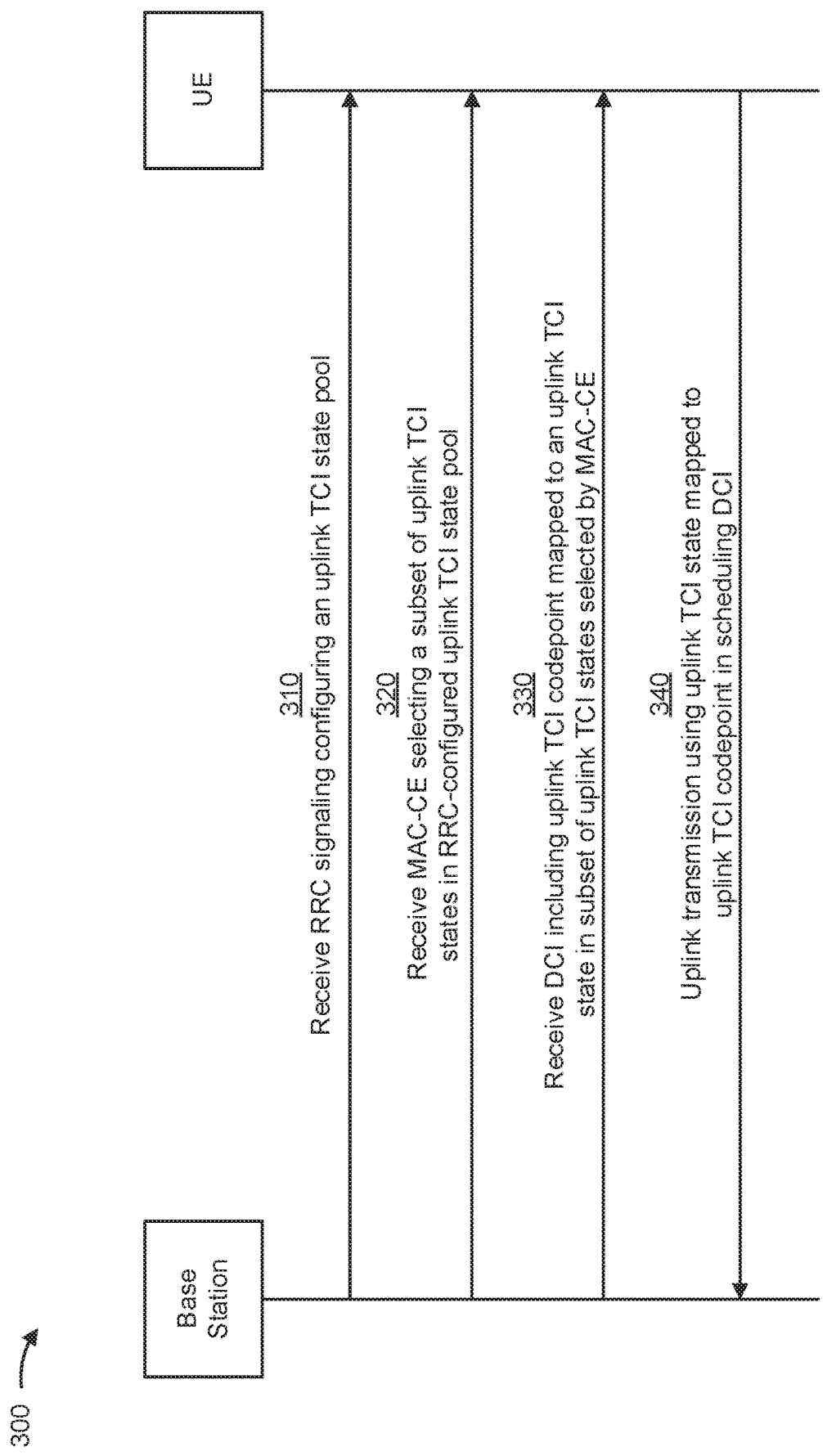
FIG. 3 is a diagram illustrating an example call flow related to uplink multiple input multiple output (MIMO) communication, in accordance with various aspects of the present disclosure.

FIG. 3 is a diagram illustrating an example call flow 300 related to uplink MIMO communication, in accordance with various aspects of the present disclosure. As shown in FIG. 3, a UE may communicate with a base station over a wireless network (e.g., wireless network 100). Furthermore, as described herein, the UE and the base station may communicate with each other using beams. For example, in some cases, a downlink transmission configuration indicator (TCI) state may define a beam according to a downlink transmit beam to be used by the base station and a corresponding downlink receive beam to be used by the UE. In general, a downlink TCI state may indicate a source reference signal and a quasi-co-location (QCL) type to be used for the corresponding beam. For example, the QCL type may correspond to one or more QCL relationships that indicate how the source reference signal is to be quasi-co-located (QCLed) with a channel on the beam. Two antenna ports are said to be QCLed if properties of the channel over which a symbol on one antenna port (e.g., the channel on the beam) is conveyed can be inferred from the channel over which a symbol on the other antenna port is conveyed (e.g., the source reference signal). Examples of QCL relationships that can be bundled in a QCL type may include a Doppler shift, a Doppler spread, an average delay, a delay spread, a spatial receive parameter, and/or the like. Accordingly, the QCL relationship(s) indicated in a TCI state can generally be used to derive the properties of a beam from the properties of the source reference signal.

Furthermore, on an uplink, a beam is typically defined according to uplink spatial relation information that indicates a spatial domain transmission filter to be used by the UE for a corresponding uplink communication. Accordingly, in this case, the uplink spatial relation information may indicate an uplink transmit beam to be used by the UE and a corresponding uplink receive beam to be used by the base station. Additionally, or alternatively, an uplink TCI state may be defined for beamformed uplink communications. In such cases, each valid uplink TCI state configuration may contain a source reference signal to indicate an uplink transmit beam for a target uplink communication (e.g., a target uplink reference signal or a target uplink channel). For example, the source reference signal may be an uplink reference signal such as a sounding reference signal (SRS) or a downlink reference signal such as a synchronization signal block (SSB), a channel state information reference signal (CSI-RS), and/or the like. Furthermore, the target uplink communication may be a physical random access channel (PRACH), a physical uplink control channel (PUCCH), a physical uplink shared channel (PUSCH), an SRS, a demodulation reference signal (DMRS) (e.g., a DMRS for a PUCCH or a PUSCH), and/or the like. In this way, supporting uplink TCI states may enable a unified TCI framework for downlink and uplink communications, may enable the base station to indicate various uplink QCL relationships for an uplink TCI state (e.g., Doppler shift, Doppler spread, average delay, delay spread, and/or the like), and/or the like. For example, in FIG. 3, the example call flow 300 can be used to inform the UE about which uplink TCI state is to be activated for a particular uplink communication.

In particular, as shown in FIG. 3, and by reference number 310, the base station may transmit, and the UE may receive, radio resource control (RRC) signaling configuring an uplink TCI state pool for the UE. In some aspects, the RRC signaling may include one or more RRC messages to configure an uplink TCI state pool for a particular uplink resource or resource set. For example, an uplink resource associated with an RRC-configured uplink TCI state pool may generally include one or more time and frequency resources (e.g., resource blocks) that the UE can use to transmit an uplink communication (e.g., an uplink reference signal such as an SRS and/or the like, or an uplink channel such as a PRACH, PUCCH, PUSCH, and/or the like). Additionally, or alternatively, an uplink resource set associated with a configured uplink TCI state pool may include a set of time and frequency resources (e.g., a set of resource blocks) that the UE can use to transmit an uplink communication. In some aspects, the uplink TCI state pool may include up to 128 candidate uplink TCI states that may be used for the corresponding uplink communication. For example, in some aspects, each candidate uplink TCI state included in an uplink TCI state pool configuration may contain a source reference signal to indicate an uplink transmit beam to be used for a target uplink communication. For example, the source reference signal may include an uplink reference signal (e.g., an SRS) or a downlink reference signal (e.g., an SSB or CSI-RS), and the target uplink communication may include an uplink reference signal (e.g., an SRS), an uplink channel (e.g., a PRACH, PUCCH, or PUSCH), an uplink reference signal for an uplink channel (e.g., a DMRS for a PUCCH or PUSCH), and/or the like. Furthermore, in some aspects, the uplink TCI state pool for a particular uplink resource or uplink resource set may be associated with an uplink TCI state identifier space specific to a particular bandwidth part, a particular component carrier, and/or the UE.

As further shown in FIG. 3, and by reference number 320, the base station may transmit, and the UE may receive, a medium access control (MAC) control element (MAC-CE) selecting a subset of the candidate uplink TCI states in the RRC-configured uplink TCI state pool. For example, as described above, the RRC-configured uplink TCI state pool may include up to 128 candidate uplink TCI states for one or more uplink resources or uplink resource sets, and the MAC-CE may include information to select up to $2^N$ uplink TCI states from the RRC-configured uplink TCI state pool, where N is a quantity of bits that subsequent downlink control information (DCI) may include in a TCI request field to activate a particular uplink TCI state for an uplink transmission scheduled by the DCI. For example, in some aspects, the MAC-CE may select up to eight (8) uplink TCI states from the RRC-configured uplink TCI state pool, which may be sequentially mapped to eight (8) possible codepoints that DCI may provide in a three-bit TCI request field for a dynamically scheduled or semi-persistently scheduled uplink communication. Accordingly, as shown by reference number 330, the base station may transmit, and the UE may receive, DCI including an uplink TCI codepoint (e.g., in a three-bit uplink TCI request field) to be mapped to an uplink TCI state in the subset of uplink TCI states selected by the MAC-CE.

As further shown in FIG. 3, and by reference number 340, the UE may perform an uplink transmission using the uplink TCI state mapped to the uplink TCI codepoint included in the DCI scheduling the uplink transmission, which may include an SRS, a PRACH, a PUCCH, a PUSCH, a DMRS for a PUCCH, a DMRS for a PUSCH, and/or the like. For example, in some aspects, the UE may perform the uplink transmission using an uplink transmit beam associated with the uplink TCI state identified by the uplink TCI codepoint included in the scheduling DCI, and the base station may receive the uplink transmission using an uplink receive beam that corresponds to the uplink transmit beam.

Accordingly, in cases where the base station and the UE are configured to communicate on an uplink using uplink TCI states (e.g., as part of a unified TCI framework for the uplink and a downlink), RRC signaling configures an uplink TCI state pool that includes multiple candidate uplink TCI states, and a MAC-CE is then used to select $2^N$ or fewer uplink TCI states from the uplink TCI state pool, where N is a quantity of bits used to activate a particular uplink TCI state in DCI scheduling an uplink transmission. However, in some cases, the UE may receive the DCI used to schedule the uplink transmission prior to receiving a MAC-CE to down-select the candidate uplink TCI states in the RRC-configured uplink TCI state pool. In this case, because the DCI scheduling the uplink indicates the uplink beam to be used according to uplink TCI codepoint, the UE may be unable to unambiguously determine the uplink beam to be used prior to a MAC-CE down-selecting the candidate uplink TCI states in the RRC-configured uplink TCI state pool to a quantity that can be mapped to the uplink TCI codepoint (e.g., eight or fewer in the case of a three-bit uplink TCI codepoint).

Accordingly, some aspects described herein relate to techniques and apparatuses to configure an uplink MIMO communication (e.g., a PUSCH communication) when uplink DCI scheduling the uplink MIMO communication includes an uplink TCI codepoint prior to a MAC-CE selecting a subset of uplink TCI states in an RRC-configured uplink TCI state pool. For example, as described in further detail herein, the UE may be configured with one or more SRS resources and/or SRS resource sets for codebook or non-codebook uplink MIMO communication, and the UE may use a default SRS resource configuration to transmit the uplink MIMO communication prior to a MAC-CE selecting a subset of uplink TCI states in an RRC-configured uplink TCI state pool. In this way, the UE may determine various parameters to be used for the uplink MIMO communication (e.g., an SRS transmission, a PUSCH transmission, and/or the like) according to the default SRS resource configuration. For example, the default SRS resource configuration may be used to determine one or more power control parameters to be used for the uplink MIMO communication, one or more precoding parameters to be used for the uplink MIMO communication, an uplink beam to be used for the uplink MIMO communication, and/or the like. Furthermore, in some aspects, the UE may be configured to map a codepoint included in the scheduling DCI to a particular uplink TCI state, SRS triggering state, and/or the like based at least in part on a quantity of uplink TCI states included in an RRC-configured uplink TCI state pool, a quantity of RRC-configured SRS triggering states, and/or the like. In this way, the UE and the base station may determine an unambiguous mapping between the codepoint included in the scheduling DCI and an RRC-configured uplink TCI state and/or SRS triggering state without requiring a MAC-CE to down-select the RRC-configured uplink TCI states and/or SRS triggering states to a quantity that can be sequentially mapped to possible values for the codepoint.

As indicated above, FIG. 3 is provided as an example. Other examples may differ from what is described with respect to FIG. 3.

Figure 4:
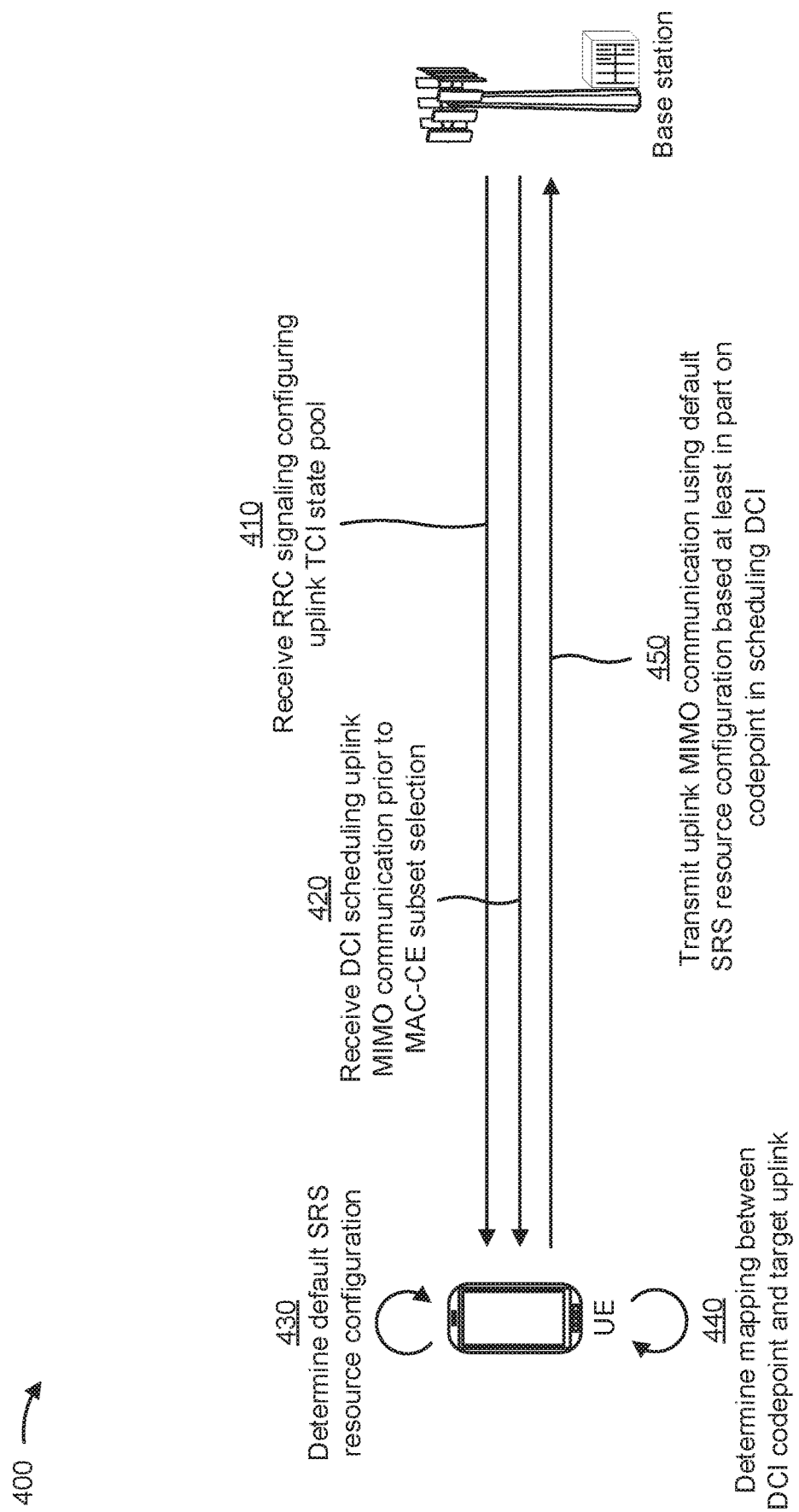
FIG. 4 is a diagram illustrating an example of a default uplink MIMO transmission prior to uplink transmission configuration indication (TCI) state activation, in accordance with various aspects of the present disclosure.

FIG. 4 is a diagram illustrating an example 400 of a default uplink MIMO transmission prior to uplink TCI state activation, in accordance with various aspects of the present disclosure. As shown in FIG. 4, example 400 includes a UE (e.g., UE 120) in communication with a base station (e.g., base station 110) over a wireless network (e.g., wireless network 100). In some aspects, as described herein, the UE and the base station may communicate on an uplink using beamformed communications. For example, the UE may use an uplink transmit beam when transmitting an uplink communication, and the base station may use an uplink receive beam corresponding to the uplink transmit beam to receive the uplink communication. In general, the base station may perform uplink beam management to configure, activate, deactivate, or otherwise update the uplink transmit beam and the corresponding uplink receive beam based at least in part on uplink TCI states. For example, the UE may support beamformed uplink communication using uplink TCI states, and downlink signaling from the base station to the UE may be used to indicate a particular uplink TCI state to be activated and used for an uplink communication from the UE to the base station.

As shown in FIG. 4, and by reference number 410, the base station may transmit, and the UE may receive, RRC signaling configuring an uplink TCI state pool. For example, as described above, the RRC signaling may include one or more RRC messages used to configure an uplink TCI state pool that includes up to 128 candidate uplink TCI states that may be used for an uplink communication. For example, in some aspects, each candidate uplink TCI state included in the uplink TCI state pool configuration may indicate a QCL relationship between a source reference signal and a target uplink communication. For example, the source reference signal may include an uplink reference signal (e.g., an SRS) or a downlink reference signal (e.g., an SSB or CSI-RS), and the target uplink communication may include an uplink reference signal (e.g., an SRS), an uplink channel (e.g., a PRACH, PUCCH, or PUSCH), an uplink reference signal for an uplink channel (e.g., a DMRS for a PUCCH or PUSCH), and/or the like. Accordingly, each uplink TCI state in the RRC-configured uplink TCI state pool may be used to determine various transmission parameters (e.g., power control, precoding, beam information, and/or the like) to be used for the target uplink communication based at least in part on the source reference signal.

As further shown in FIG. 4, and by reference number 420, the base station may transmit, and the UE may receive, DCI scheduling an uplink MIMO communication prior to a MAC-CE selecting a subset of the uplink TCI states included in the RRC-configured uplink TCI state pool. For example, in some aspects, the uplink MIMO communication scheduled by the DCI may include a PUSCH, and the DCI may be associated with an uplink DCI format without an uplink TCI request field (e.g., DCI format 0_0 or 0_1). Alternatively, the DCI may include an uplink TCI request field, in which case the DCI may include an SRS resource indicator (SRI) and/or transmit precoding matrix indicator (TPMI) index to indicate precoder and/or rank information for the uplink MIMO communication.

As further shown in FIG. 4, and by reference number 430, the UE may determine a default SRS resource configuration to be used for the uplink MIMO communication based at least in part on receiving the DCI scheduling the uplink MIMO prior to a MAC-CE selecting a subset of the uplink TCI states in the RRC-configured uplink TCI state pool. For example, for both codebook-based and non-codebook-based uplink MIMO transmissions, the UE may be configured with one or more SRS resource sets that indicate various communication parameters to be used for SRS transmissions.

For example, in some aspects, the UE may be configured with multiple SRS resource sets, each of which include one or more SRS resources. In this case, each SRS resource in an SRS resource set has the same quantity of ports, and different SRS resource sets can include different quantities of SRS ports and/or different quantities of SRS resources. For example, a first SRS resource set may include four SRS resources that all have four SRS ports, and a second SRS resource set may include two SRS resources that all have two SRS ports. Furthermore, in the case of a non-codebook uplink MIMO transmission, an uplink TCI state may be used to indicate an uplink beam associated with an SRS resource set and/or an SRI to indicate precoder and/or rank information. In the case of a codebook uplink MIMO transmission, an uplink TCI state may similarly indicate an uplink beam associated with an SRS resource set, and in this case, a TPMI index may indicate the precoder and/or rank information.

Alternatively, in cases where the UE is configured with a single SRS resource set, the SRS resource set may include one or more SRS resources that may have different quantities of SRS ports. For example, the SRS resource set may include one or more SRS resources with two SRS ports, one or more SRS resources with four SRS ports, and/or the like. Furthermore, in the case of a non-codebook uplink MIMO transmission, an uplink TCI state may similarly indicate an uplink beam associated with an SRS resource and/or an SRI to indicate precoder and/or rank information, or the uplink TCI state may indicate an uplink beam associated with an SRS resource and a TPMI index to indicate the precoder and/or rank information in the case of a codebook uplink MIMO transmission.

Accordingly, in some aspects, the UE may determine the default SRS resource configuration based at least in part on a default SRS resource (e.g., in cases where the UE is configured with a single SRS resource set that may include multiple SRS resources with different parameters) or a default SRS resource set (e.g., in cases where the UE is configured with multiple SRS resource sets, each of which may include one or more SRS resources that have the same parameters). For example, in some aspects, the default SRS resource or default SRS resource set may correspond to an SRS resource or an SRS resource set having a lowest identifier, a highest identifier, and/or the like. Additionally, or alternatively, the default SRS resource or default SRS resource set may be determined based at least in part on respective priorities for the SRS resources and/or SRS resource sets configured for the UE. For example, in some aspects, the priorities may be defined such that SRS resources or SRS resource sets associated with a periodic configuration have a highest priority, SRS resources or SRS resource sets associated with a semi-persistent configuration have a next highest priority, and SRS resources or SRS resource sets associated with an aperiodic configuration have a lowest priority. Alternatively, the priorities may be defined such that SRS resources or SRS resource sets associated with an aperiodic configuration have a highest priority, SRS resources or SRS resource sets associated with a semi-persistent configuration have a next highest priority, and SRS resources or SRS resource sets associated with a periodic configuration have a lowest priority. In such cases, where there are multiple SRS resources or multiple SRS resource sets with the same priority, identifiers associated with the multiple SRS resources or SRS resource sets may be used to determine the default SRS resource or SRS resource set.

In some aspects, based at least in part on the default SRS resource or SRS resource set, the UE may determine the default SRS resource configuration. For example, in some aspects, the default SRS resource configuration may include a set of power control parameters to be used for the uplink MIMO communication (e.g., a pathloss reference signal, a P0 parameter reflecting a target signal-to-interference-plus noise ratio (SINR) for the uplink MIMO communication, an alpha parameter representing a fractional power control factor, a closed loop index that may indicate power control parameters for different uplink panels, and/or the like). Accordingly, the UE may determine the power control parameters to be used for the uplink MIMO communication, which may include a PUSCH transmission scheduled by the DCI, based at least in part on the power control parameters associated with the default SRS resource configuration. For example, in the case of codebook-based MIMO transmission, each SRS resource in an SRS resource set may have a different set of power control parameters, whereby the power control parameters of codebook-based MIMO transmission may be determined according to the power control parameters associated with the default SRS resource in the SRS resource set. Similarly, in cases where the UE is configured with multiple SRS resource sets for codebook or non-codebook-based MIMO transmission, each SRS resource set may be associated with a different set of power control parameters, whereby the power control parameters of codebook or non-codebook-based MIMO transmission may be determined according to the power control parameters associated with the default SRS resource set among the multiple SRS resource sets.

Furthermore, in some aspects, the default SRS resource configuration may be used to determine additional transmission parameters for the uplink MIMO communication. For example, in some aspects, the UE may determine one or more precoding parameters based at least in part on precoding parameters associated with the default SRS resource configuration (e.g., a maximum number of SRS ports, a quantity or SRS resources, a maximum rank associated with the SRS resource set), and/or the like. In this way, the UE may determine precoding parameters (e.g., an SRI or TPMI) to be used for the uplink MIMO communication (e.g., according to a bit-width and a codepoint mapping of an SRI or TPMI in a field of the DCI). In addition, in some aspects, the default SRS resource configuration may be used to determine an uplink beam to be used for the uplink MIMO communication. For example, in some aspects, a beam associated with the default SRS resource configuration may be used as the uplink beam for the uplink MIMO communication.

As further shown in FIG. 4, and by reference number 440, the UE may determine a mapping between a codepoint included in the DCI scheduling the uplink MIMO communication and the target uplink MIMO communication. For example, in some cases, the DCI may include the codepoint in an SRS request field to indicate an SRS triggering state to be activated (e.g., to schedule an SRS transmission using the indicated SRS triggering state). Additionally, or alternatively, in some cases, the DCI may include the codepoint in an uplink TCI request field to indicate the target uplink MIMO communication. Accordingly, because the scheduling DCI is received prior to a MAC-CE selecting a subset of RRC-configured SRS triggering states and/or a subset of RRC-configured uplink TCI states, the UE may determine a direct mapping from the codepoint in the scheduling DCI to one of the RRC-configured SRS triggering states and/or RRC-configured uplink TCI states, as described herein.

For example, in cases where the scheduling DCI includes the codepoint in an SRS request field that has N bits, the codepoint may directly indicate the SRS triggering state (without any MAC-CE subset selection) when the quantity of RRC-configured triggering states is less than or equal to $2^N-1$. In particular, one codepoint (e.g., '000') may indicate that no SRS request is triggered, which leaves $2^N-1$ possible codepoints that can be provided in the SRS request field to trigger an SRS transmission. Accordingly, when the quantity of RRC-configured SRS triggering states is less than or equal to $2^N-1$, the N bits in the SRS request field can unambiguously identify one of the RRC-configured SRS triggering states without any MAC-CE subset selection. Alternatively, in cases where the quantity of RRC-configured SRS triggering states is greater than $2^N-1$, the first $2^N-1$ RRC-configured SRS triggering states may be mapped to the N-bit SRS request field, which can then directly indicate the SRS triggering state to be activated without any MAC-CE subset selection.

Similarly, in cases where the scheduling DCI includes the codepoint in an uplink TCI request field that has N bits, the codepoint may directly indicate the uplink TCI state (and therefore the target uplink MIMO communication) without any MAC-CE subset selection when the quantity of RRC-configured triggering states is less than or equal to $2^N$. In particular, because the N bits in the uplink TCI request field can have up to $2^N$ different values, the N bits in the uplink TCI request field can unambiguously identify one of the RRC-configured uplink TCI states without any MAC-CE subset selection when the quantity of RRC-configured uplink TCI states is less than or equal to $2^N$. Alternatively, in cases where the quantity of RRC-configured uplink TCI states is greater than $2^N$, the first $2^N$ RRC-configured uplink TCI states may be mapped to the N-bit uplink TCI request field, which can then directly indicate the uplink TCI state to be activated without any MAC-CE subset selection.

As further shown in FIG. 4, and by reference number 450, the UE may transmit, and the base station may receive, the uplink MIMO communication using the default SRS resource configuration based at least in part on the codepoint included in the DCI scheduling the uplink MIMO communication. For example, in some aspects, the UE may use the codepoint included in the scheduling DCI to determine the SRS triggering state to be activated, to determine the target uplink MIMO communication, and/or the like, and the default SRS resource configuration may be used to determine the power control parameters, precoding parameters, beam parameters, and/or the like for the uplink MIMO communication. Additionally, or alternatively, in some aspects, the power control parameters for the uplink MIMO communication can be determined based at least in part on an uplink TCI state (e.g., the uplink TCI state mapped to the codepoint included in the scheduling DCI). For example, in some aspects, the RRC signaling configuring the uplink TCI state pool may further configure one or more power control parameters (e.g., a pathloss reference signal, a P0 parameter, an alpha parameter, a closed loop index identifier, and/or the like) per uplink TCI state. In this case, by changing, updating, or otherwise indicating the uplink TCI state to be used for the uplink MIMO communication, the power control parameters may be configured simultaneously. Additionally, or alternatively, the power control parameters may be configured via separate signaling. For example, in some aspects, multiple open-loop power control parameters may be configured via RRC signaling, and DCI scheduling a PUSCH may indicate an open-loop power control parameter to be used among the multiple RRC-configured open-loop power control parameters. Additionally, or alternatively, power control parameters may be configured for a PUCCH group or SRS resource set via RRC signaling, and a MAC-CE can be used to update the power control parameters for the PUCCH group or SRS resource set. In this way, an uplink TCI state can be used to indicate an uplink MIMO communication (e.g., an SRS, a PUCCH, a PUSCH, and/or the like) and different techniques can be used to update the power control parameters for the uplink MIMO communication (e.g., relative to the power control parameters determined from the default SRS resource configuration).

As indicated above, FIG. 4 is provided as an example. Other examples may differ from what is described with respect to FIG. 4.

Figure 5:
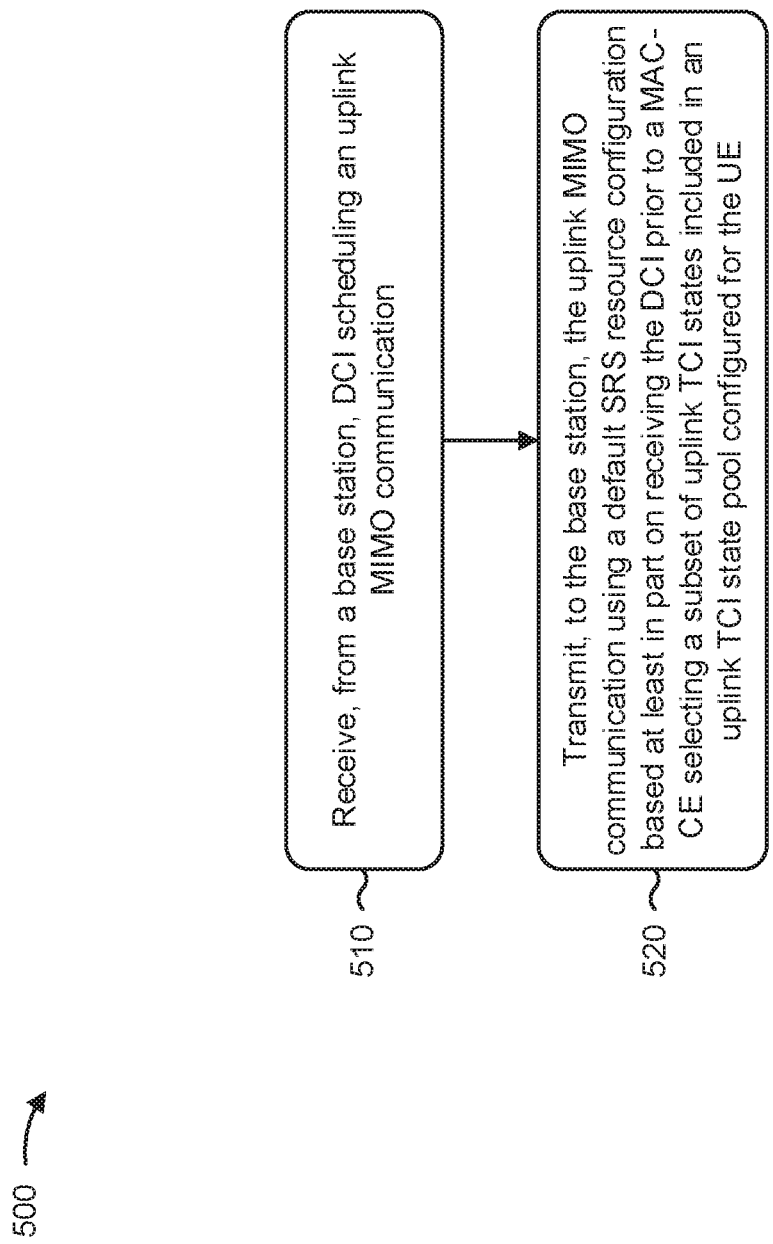
FIG. 5 is a diagram illustrating an example process performed, for example, by a UE, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120 and/or the like) performs operations associated with a default uplink MIMO transmission prior to uplink TCI state activation.

As shown in FIG. 5, in some aspects, process 500 may include receiving, from a base station, DCI scheduling an uplink MIMO communication (block 510). For example, the UE may receive (e.g., using antenna 252, DEMOD 254, MIMO detector 256, receive processor 258, controller/processor 280, memory 282, and/or the like), from a base station, DCI scheduling an uplink MIMO communication, as described above.

As further shown in FIG. 5, in some aspects, process 500 may include transmitting, to the base station, the uplink MIMO communication using a default SRS resource configuration based at least in part on receiving the DCI prior to a MAC-CE selecting a subset of uplink TCI states included in an uplink TCI state pool configured for the UE (block 520). For example, the UE may transmit (e.g., using controller/processor 280, transmit processor 264, TX MIMO processor 266, MOD 254, antenna 252, and/or the like), to the base station, the uplink MIMO communication using a default SRS resource configuration based at least in part on receiving the DCI prior to a MAC-CE selecting a subset of uplink TCI states included in an uplink TCI state pool configured for the UE, as described above.

Process 500 may include additional aspects, such as any single aspect or any combination of aspects described below and/or in connection with one or more other processes described elsewhere herein.

In a first aspect, the default SRS resource configuration used for the uplink MIMO communication includes one or more power control parameters associated with one or more of a default SRS resource or a default SRS resource set.

In a second aspect, alone or in combination with the first aspect, the default SRS resource configuration used for the uplink MIMO communication includes one or more precoding parameters associated with one or more of a default SRS resource or a default SRS resource set.

In a third aspect, alone or in combination with one or more of the first and second aspects, the default SRS resource configuration used for the uplink MIMO communication includes an indication of an uplink transmit beam associated with one or more of a default SRS resource or a default SRS resource set.

In a fourth aspect, alone or in combination with one or more of the first through third aspects, the default SRS resource configuration is determined based at least in part on an identifier associated with one or more SRS resources or one or more SRS resource sets configured for the UE.

In a fifth aspect, alone or in combination with one or more of the first through fourth aspects, the default SRS resource configuration is determined based at least in part on a priority associated with one or more SRS resources or one or more SRS resource sets configured for the UE.

In a sixth aspect, alone or in combination with one or more of the first through fifth aspects, the DCI scheduling the uplink MIMO communication is associated with a DCI format without an uplink TCI request field.

In a seventh aspect, alone or in combination with one or more of the first through sixth aspects, the DCI scheduling the uplink MIMO communication includes an uplink TCI request field that indicates an uplink TCI state codepoint associated with the uplink MIMO communication.

In an eighth aspect, alone or in combination with one or more of the first through seventh aspects, the DCI scheduling the uplink MIMO communication indicates one or more of an SRI or a TPMI for the uplink MIMO communication based at least in part on the uplink MIMO communication having a codebook-based configuration.

In a ninth aspect, alone or in combination with one or more of the first through eighth aspects, the DCI scheduling the uplink MIMO communication includes a codepoint having N bits mapped to an SRS triggering state in a set of SRS triggering states configured for the UE when a quantity of SRS triggering states in the set of SRS triggering states is $2^N-1$ or fewer.

In a tenth aspect, alone or in combination with one or more of the first through ninth aspects, the DCI scheduling the uplink MIMO communication includes a codepoint having N bits mapped to one of a first $2^N-1$ SRS triggering states in a set of SRS triggering states configured for the UE when a quantity of SRS triggering states in the set of SRS triggering states is greater than $2^N-1$.

In an eleventh aspect, alone or in combination with one or more of the first through tenth aspects, the DCI scheduling the uplink MIMO communication includes a codepoint having N bits mapped to one of the uplink TCI states included in the uplink TCI state pool configured for the UE when a quantity of uplink TCI states included in the uplink TCI state pool is $2^N$ or fewer.

In a twelfth aspect, alone or in combination with one or more of the first through eleventh aspects, the DCI scheduling the uplink MIMO communication includes a codepoint having N bits mapped to one of a first $2^N$ uplink TCI states included in the uplink TCI state pool configured for the UE when a quantity of uplink TCI states included in the uplink TCI state pool is greater than $2^N$.

In a thirteenth aspect, alone or in combination with one or more of the first through twelfth aspects, the uplink MIMO communication is transmitted using one or more power control parameters associated with an uplink TCI state codepoint indicated in the DCI scheduling the uplink MIMO communication.

In a fourteenth aspect, alone or in combination with one or more of the first through thirteenth aspects, the uplink MIMO communication is transmitted using one or more power control parameters indicated in the DCI scheduling the uplink MIMO communication when the uplink MIMO communication is a PUSCH or in the MAC-CE when the uplink MIMO communication is a PUCCH or an SRS.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
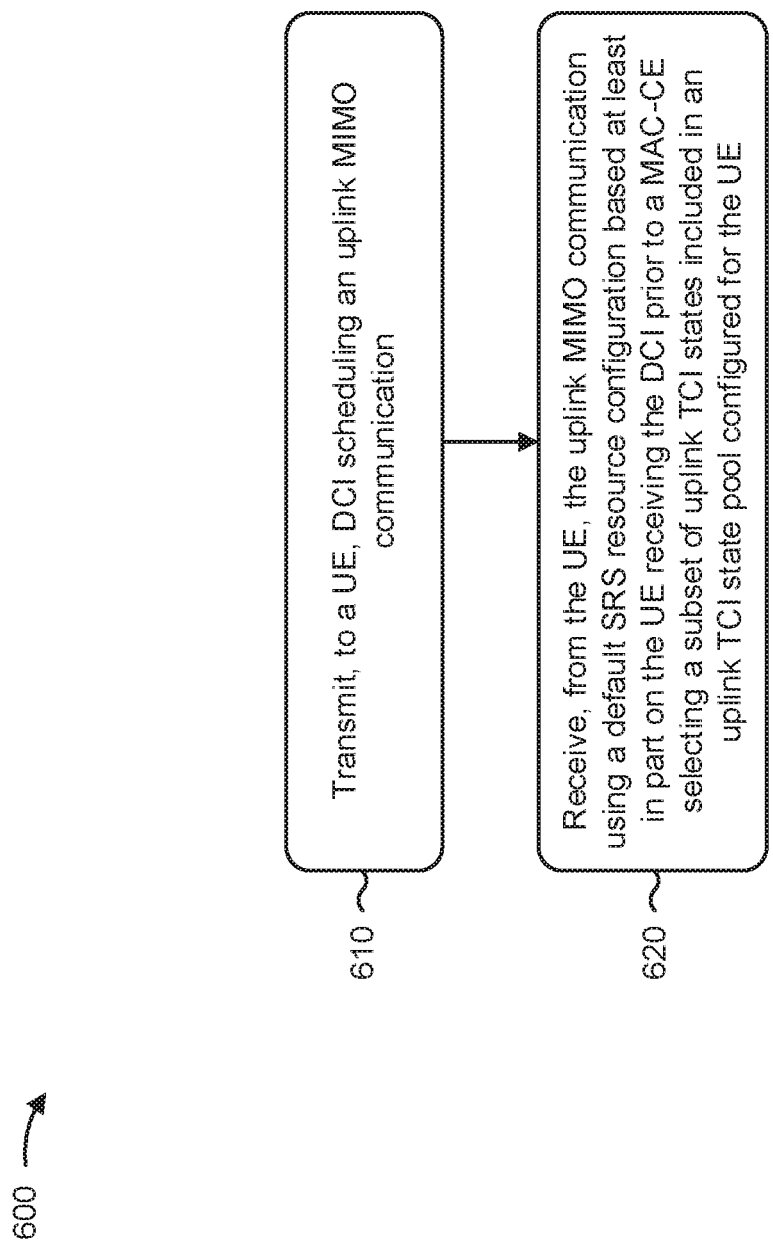
FIG. 6 is a diagram illustrating an example process performed, for example, by a base station, in accordance with various aspects of the present disclosure.

FIG. 6 is a diagram illustrating an example process 600 performed, for example, by a base station, in accordance with various aspects of the present disclosure. Example process 600 is an example where the base station (e.g., base station 110 and/or the like) performs operations associated with a default uplink MIMO transmission prior to uplink TCI state activation.

As shown in FIG. 6, in some aspects, process 600 may include transmitting, to a UE, DCI scheduling an uplink MIMO communication (block 610). For example, the base station may transmit (e.g., using controller/processor 240, transmit processor 220, TX MIMO processor 230, MOD 232, antenna 234, and/or the like), to a UE, DCI scheduling an uplink MIMO communication, as described above.

As further shown in FIG. 6, in some aspects, process 600 may include receiving, from the UE, the uplink MIMO communication using a default SRS resource configuration based at least in part on the UE receiving the DCI prior to a MAC-CE selecting a subset of uplink TCI states included in an uplink TCI state pool configured for the UE (block 620). For example, the base station may receive (e.g., using antenna 234, DEMOD 232, MIMO detector 236, receive processor 238, controller/processor 240, and/or the like), from the UE, the uplink MIMO communication using a default SRS resource configuration based at least in part on the UE receiving the DCI prior to a MAC-CE selecting a subset of uplink TCI states included in an uplink TCI state pool configured for the UE, as described above.

Process 600 may include additional aspects, such as any single aspect or any combination of aspects described below and/or in connection with one or more other processes described elsewhere herein.

In a first aspect, the default SRS resource configuration used for the uplink MIMO communication includes one or more power control parameters associated with one or more of a default SRS resource or a default SRS resource set.

In a second aspect, alone or in combination with the first aspect, the default SRS resource configuration used for the uplink MIMO communication includes one or more precoding parameters associated with one or more of a default SRS resource or a default SRS resource set.

In a third aspect, alone or in combination with one or more of the first and second aspects, the default SRS resource configuration used for the uplink MIMO communication includes an indication of an uplink transmit beam associated with one or more of a default SRS resource or a default SRS resource set.

In a fourth aspect, alone or in combination with one or more of the first through third aspects, the default SRS resource configuration is determined based at least in part on an identifier associated with one or more SRS resources or one or more SRS resource sets configured for the UE.

In a fifth aspect, alone or in combination with one or more of the first through fourth aspects, the default SRS resource configuration is determined based at least in part on a priority associated with one or more SRS resources or one or more SRS resource sets configured for the UE.

In a sixth aspect, alone or in combination with one or more of the first through fifth aspects, the DCI scheduling the uplink MIMO communication is associated with a DCI format without an uplink TCI request field.

In a seventh aspect, alone or in combination with one or more of the first through sixth aspects, the DCI scheduling the uplink MIMO communication includes an uplink TCI request field that indicates an uplink TCI state codepoint associated with the uplink MIMO communication.

In an eighth aspect, alone or in combination with one or more of the first through seventh aspects, the DCI scheduling the uplink MIMO communication indicates one or more of an SRI or a TPMI for the uplink MIMO communication based at least in part on the uplink MIMO communication having a codebook-based configuration.

In a ninth aspect, alone or in combination with one or more of the first through eighth aspects, the DCI scheduling the uplink MIMO communication includes a codepoint having N bits mapped to an SRS triggering state in a set of SRS triggering states configured for the UE when a quantity of SRS triggering states in the set of SRS triggering states is $2^N-1$ or fewer.

In a tenth aspect, alone or in combination with one or more of the first through ninth aspects, the DCI scheduling the uplink MIMO communication includes a codepoint having N bits mapped to one of a first $2^N-1$ SRS triggering states in a set of SRS triggering states configured for the UE when a quantity of SRS triggering states in the set of SRS triggering states is greater than $2^N-1$.

In an eleventh aspect, alone or in combination with one or more of the first through tenth aspects, the DCI scheduling the uplink MIMO communication includes a codepoint having N bits mapped to one of the uplink TCI states included in the uplink TCI state pool configured for the UE when a quantity of uplink TCI states included in the uplink TCI state pool is $2^N$ or fewer.

In a twelfth aspect, alone or in combination with one or more of the first through eleventh aspects, the DCI scheduling the uplink MIMO communication includes a codepoint having N bits mapped to one of a first $2^N$ uplink TCI states included in the uplink TCI state pool configured for the UE when a quantity of uplink TCI states included in the uplink TCI state pool is greater than $2^N$.

In a thirteenth aspect, alone or in combination with one or more of the first through twelfth aspects, the uplink MIMO communication is transmitted using one or more power control parameters associated with an uplink TCI state codepoint indicated in the DCI scheduling the uplink MIMO communication.

In a fourteenth aspect, alone or in combination with one or more of the first through thirteenth aspects, the uplink MIMO communication is transmitted using one or more power control parameters indicated in the DCI scheduling the uplink MIMO communication when the uplink MIMO communication is a PUSCH or in the MAC-CE when the uplink MIMO communication is a PUCCH or an SRS.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software.

The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving, from a base station, downlink control information (DCI) scheduling an uplink multiple input multiple output (MIMO) communication; and
   transmitting, to the base station, the uplink MIMO communication using a default sounding reference signal (SRS) resource configuration based at least in part on receiving the DCI prior to a medium access control (MAC) control element (MAC-CE) selecting a subset of uplink transmission configuration indication (TCI) states included in an uplink TCI state pool configured for the UE.

2. The method of claim 1, wherein the default SRS resource configuration used for the uplink MIMO communication includes one or more power control parameters associated with one or more of a default SRS resource or a default SRS resource set.

3. The method of claim 1, wherein the default SRS resource configuration used for the uplink MIMO communication includes one or more precoding parameters associated with one or more of a default SRS resource or a default SRS resource set.

4. The method of claim 1, wherein the default SRS resource configuration used for the uplink MIMO communication includes an indication of an uplink transmit beam associated with one or more of a default SRS resource or a default SRS resource set.

5. The method of claim 1, wherein the default SRS resource configuration is determined based at least in part on an identifier associated with one or more SRS resources or one or more SRS resource sets configured for the UE.

6. The method of claim 1, wherein the default SRS resource configuration is determined based at least in part on a priority associated with one or more SRS resources or one or more SRS resource sets configured for the UE.

7. The method of claim 1, wherein the DCI scheduling the uplink MIMO communication is associated with a DCI format without an uplink TCI request field.

8. The method of claim 1, wherein the DCI scheduling the uplink MIMO communication includes an uplink TCI request field that indicates an uplink TCI state codepoint associated with the uplink MIMO communication.

9. The method of claim 1, wherein the DCI scheduling the uplink MIMO communication indicates one or more of an SRS resource indicator (SRI) or a transmit precoder matrix indicator (TPMI) for the uplink MIMO communication based at least in part on the uplink MIMO communication having a codebook-based configuration.

10. The method of claim 1, wherein the DCI scheduling the uplink MIMO communication includes a codepoint having N bits mapped to an SRS triggering state in a set of SRS triggering states configured for the UE when a quantity of SRS triggering states in the set of SRS triggering states is 2N−1 or fewer.

11. The method of claim 1, wherein the DCI scheduling the uplink MIMO communication includes a codepoint having N bits mapped to one of a first 2N−1 SRS triggering states in a set of SRS triggering states configured for the UE when a quantity of SRS triggering states in the set of SRS triggering states is greater than 2N−1.

12. The method of claim 1, wherein the DCI scheduling the uplink MIMO communication includes a codepoint having N bits mapped to one of the uplink TCI states included in the uplink TCI state pool configured for the UE when a quantity of uplink TCI states included in the uplink TCI state pool is 2N or fewer.

13. The method of claim 1, wherein the DCI scheduling the uplink MIMO communication includes a codepoint having N bits mapped to one of a first 2N uplink TCI states included in the uplink TCI state pool configured for the UE when a quantity of uplink TCI states included in the uplink TCI state pool is greater than 2N.

14. The method of claim 1, wherein the uplink MIMO communication is transmitted using one or more power control parameters associated with an uplink TCI state codepoint indicated in the DCI scheduling the uplink MIMO communication.

15. The method of claim 1, wherein the uplink MIMO communication is transmitted using one or more power control parameters indicated in the DCI scheduling the uplink MIMO communication when the uplink MIMO communication is a physical uplink shared channel (PUSCH) or in the MAC-CE when the uplink MIMO communication is a physical uplink control channel (PUCCH) or an SRS.

16. The method of claim 1, wherein an uplink TCI state associated with an uplink beam transmitting the uplink MIMO communication is determined based on an explicit mapping between a codepoint included in the DCI and an uplink TCI state in the uplink TCI state pool, the explicit mapping determined based at least in part on a quantity of uplink TCI states included in the uplink TCI state pool.

17. A method of wireless communication performed by a base station, comprising:
transmitting, to a user equipment (UE), downlink control information (DCI) scheduling an uplink multiple input multiple output (MIMO) communication; and
receiving, from the UE, the uplink MIMO communication using a default sounding reference signal (SRS) resource configuration based at least in part on the UE receiving the DCI prior to a medium access control (MAC) control element (MAC-CE) selecting a subset of uplink transmission configuration indication (TCI) states included in an uplink TCI state pool configured for the UE.

18. The method of claim 17, wherein the default SRS resource configuration used for the uplink MIMO communication includes one or more power control parameters associated with one or more of a default SRS resource or a default SRS resource set.

19. The method of claim 17, wherein the default SRS resource configuration used for the uplink MIMO communication includes one or more precoding parameters associated with one or more of a default SRS resource or a default SRS resource set.

20. The method of claim 17, wherein the default SRS resource configuration used for the uplink MIMO communication includes an indication of an uplink transmit beam associated with one or more of a default SRS resource or a default SRS resource set.

21. The method of claim 17, wherein the default SRS resource configuration is determined based at least in part on an identifier associated with one or more SRS resources or one or more SRS resource sets configured for the UE.

22. The method of claim 17, wherein the default SRS resource configuration is determined based at least in part on a priority associated with one or more SRS resources or one or more SRS resource sets configured for the UE.

23. The method of claim 17, wherein the DCI scheduling the uplink MIMO communication is associated with a DCI format without an uplink TCI request field.

24. The method of claim 17, wherein the DCI scheduling the uplink MIMO communication includes an uplink TCI request field that indicates an uplink TCI state codepoint associated with the uplink MIMO communication.

25. The method of claim 17, wherein the DCI scheduling the uplink MIMO communication indicates one or more of an SRS resource indicator (SRI) or a transmit precoder matrix indicator (TPMI) for the uplink MIMO communication based at least in part on the uplink MIMO communication having a codebook-based configuration.

26. The method of claim 17, wherein the DCI scheduling the uplink MIMO communication includes a codepoint having N bits mapped to an SRS triggering state in a set of SRS triggering states configured for the UE when a quantity of SRS triggering states in the set of SRS triggering states is 2N−1 or fewer.

27. The method of claim 17, wherein the DCI scheduling the uplink MIMO communication includes a codepoint having N bits mapped to one of a first 2N−1 SRS triggering states in a set of SRS triggering states configured for the UE when a quantity of SRS triggering states in the set of SRS triggering states is greater than 2N−1.

28. The method of claim 17, wherein the DCI scheduling the uplink MIMO communication includes a codepoint having N bits mapped to one of the uplink TCI states included in the uplink TCI state pool configured for the UE when a quantity of uplink TCI states included in the uplink TCI state pool is 2N or fewer.

29. The method of claim 17, wherein the DCI scheduling the uplink MIMO communication includes a codepoint having N bits mapped to one of a first 2N uplink TCI states included in the uplink TCI state pool configured for the UE when a quantity of uplink TCI states included in the uplink TCI state pool is greater than 2N.

30. The method of claim 17, wherein the uplink MIMO communication is transmitted using one or more power control parameters associated with an uplink TCI state codepoint indicated in the DCI scheduling the uplink MIMO communication.

31. The method of claim 17, wherein the uplink MIMO communication is transmitted using one or more power control parameters indicated in the DCI scheduling the uplink MIMO communication when the uplink MIMO communication is a physical uplink shared channel (PUSCH) or in the MAC-CE when the uplink MIMO communication is a physical uplink control channel (PUCCH) or an SRS.

32. The method of claim 17, wherein an uplink TCI state associated with an uplink beam transmitting the uplink MIMO communication is determined based on an explicit mapping between a codepoint included in the DCI and an uplink TCI state in the uplink TCI state pool, the explicit mapping determined based at least in part on a quantity of uplink TCI states included in the uplink TCI state pool.

33. A user equipment (UE) for wireless communication, comprising:
   a memory; and
   one or more processors coupled to the memory, the one or more processors configured to:
   receive, from a base station, downlink control information (DCI) scheduling an uplink multiple input multiple output (MIMO) communication; and
   transmit, to the base station, the uplink MIMO communication using a default sounding reference signal resource configuration based at least in part on receiving the DCI prior to a medium access control (MAC) control element (MAC-CE) selecting a subset of uplink transmission configuration indication (TCI) states included in an uplink TCI state pool configured for the UE.

34. The UE of claim 33, wherein an uplink TCI state associated with an uplink beam transmitting the uplink MIMO communication is determined based on an explicit mapping between a codepoint included in the DCI and an uplink TCI state in the uplink TCI state pool, the explicit mapping determined based at least in part on a quantity of uplink TCI states included in the uplink TCI state pool.

35. A base station for wireless communication, comprising:
   a memory; and
   one or more processors coupled to the memory, the one or more processors configured to:
   transmit, to a user equipment (UE), downlink control information (DCI) scheduling an uplink multiple input multiple output (MIMO) communication; and
   receive, from the UE, the uplink MIMO communication using a default sounding reference signal resource configuration based at least in part on the UE receiving the DCI prior to a medium access control (MAC) control element (MAC-CE) selecting a subset of uplink transmission configuration indication (TCI) states included in an uplink TCI state pool configured for the UE.

36. The base station of claim 35, wherein an uplink TCI state associated with an uplink beam transmitting the uplink MIMO communication is determined based on an explicit mapping between a codepoint included in the DCI and an uplink TCI state in the uplink TCI state pool, the explicit mapping determined based at least in part on a quantity of uplink TCI states included in the uplink TCI state pool.

* * * * *